United States Patent

[11] 3,634,771

| [72] | Inventor | Jacques Edmond Hermel<br>Chilly-Mazarin, France |
|---|---|---|
| [21] | Appl. No. | 74,275 |
| [22] | Filed | Sept. 22, 1970 |
| [45] | Patented | Jan. 11, 1972 |
| [73] | Assignee | Compagnie des Compteurs<br>Paris, France |
| [32] | Priority | Oct. 2, 1969 |
| [33] | | France |
| [31] | | 6933635 |

[54] FREQUENCY-COMPARATIVE CIRCUIT OF TWO SERIES OF PULSES
5 Claims, 5 Drawing Figs.

[52] U.S. Cl. .................................................. 328/133, 307/215
[51] Int. Cl. .................................................. H03d 13/00
[50] Field of Search.......................................... 328/133, 134; 307/271, 315

[56] References Cited
UNITED STATES PATENTS

| 3,187,195 | 6/1965 | Stefanov........................ | 328/133 X |
|---|---|---|---|
| 3,382,376 | 5/1968 | Sowden......................... | 328/133 X |
| 3,448,387 | 6/1969 | Brandt et al. ................. | 307/271 X |

*Primary Examiner*—John S. Heyman
*Attorney*—Pierce, Scheffler & Parker

ABSTRACT: Frequency-comparative circuit of two series of pulses comprising a two-output bistable rocker having two inputs respectively receiving said two series of pulses, a flip-flop connected to the outputs of said bistable rocker and having an auxiliary input connected to the output of a two-input delay circuit whose two inputs are themselves connected respectively to the two inputs of said bistable rocker and a two-input NAND circuit of which one input is connected to one of the outputs of said flip-flop and the other input to one of the inputs of said bistable rocker through a reversing circuit whereby one pulse of one of said two series of pulses prevents the passage of the next pulse from the other series thus causing at the output of said NAND circuit pulses corresponding in number to the difference between the number of pulses of said two pulse series.

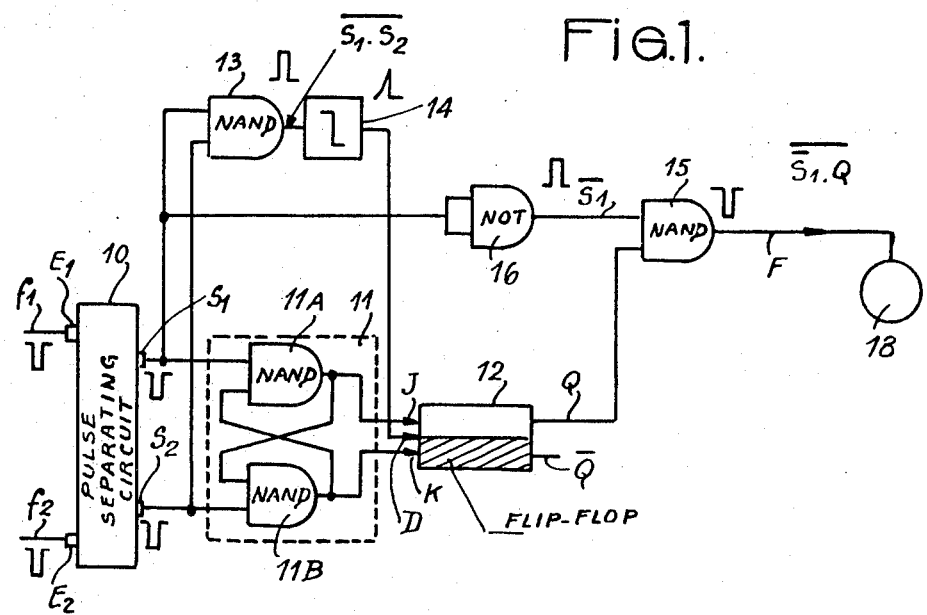
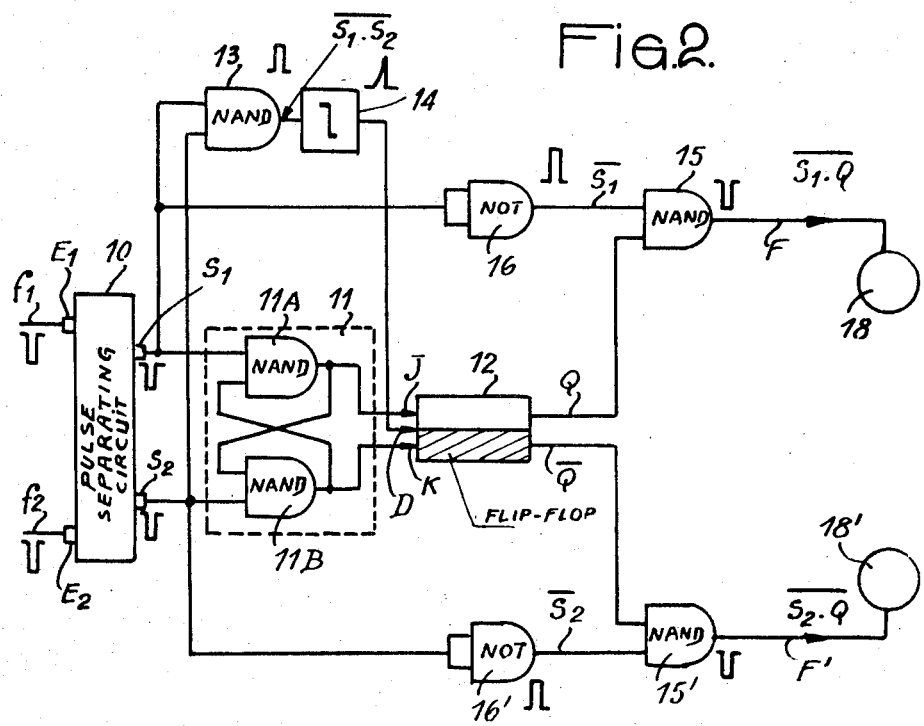

FREQUENCY-COMPARATIVE CIRCUIT OF TWO SERIES OF PULSES

This invention concerns a device allowing the frequency comparison to two series of pulses and giving a signal at a frequency equal to the difference to the recurrence frequencies of the two pulse series.

Many often the problem is met as to obtain a signal indicative of the difference between two recurrence frequencies of impulsive signals, these signals could, for instance, represent physical magnitudes such as outputs, angle speeds, etc.

The invention has for its object the provision of a simple solution to this problem, by means of a circuit, with logical components, in which each pulse of a series—this pulse itself being not transmitted—prevents the passage of the next pulse from the other series, in such a way that at the output of this circuit only appears the difference of frequencies of the two-input pulse series.

According to the invention, for the frequency comparison of two pulse series the circuit comprises a bistable rocker connected by its two inputs to two circuits giving said pulse series, a bistable flip-flop having two inputs respectively connected to the outputs of said bistable rocker, said bistable flip-flop including an auxiliary input whereby rocking thereof is caused by a control signal, a delay circuit connected through its output to said auxiliary input of said flip-flop and through each of its two inputs respectively to the two inputs of said rocker and at least one NAND circuit of which one of its two inputs is connected to one of the outputs of said flip-flop and of which the other input is connected to one of the inputs of the rocker through a reversing circuit, so that each pulse of one of said two pulse series prevents the passage of the next pulse from the other series whereby it appears, at the output of said NAND circuit, pulses of a frequency corresponding to the difference between the number of pulses of said two pulse series.

Other characteristics of the invention will better appear from the following description in connection with the enclosed drawing which shows, as a not limitative example, a way for realizing a circuit in conformity with the invention.

FIG. 1 is a synoptic schema of the frequency comparison circuit, from the invention.

FIG. 2 is a schema similar to FIG. 1 showing a development of the circuit, from the invention.

On FIG. 1 has been shown a circuit 10 for separating and synchronizing pulses on input terminals $E_1$ and $E_2$, on which are respectively applied two series of pulses having respectively frequencies $f_1$ and $f_2$.

Figure 5:
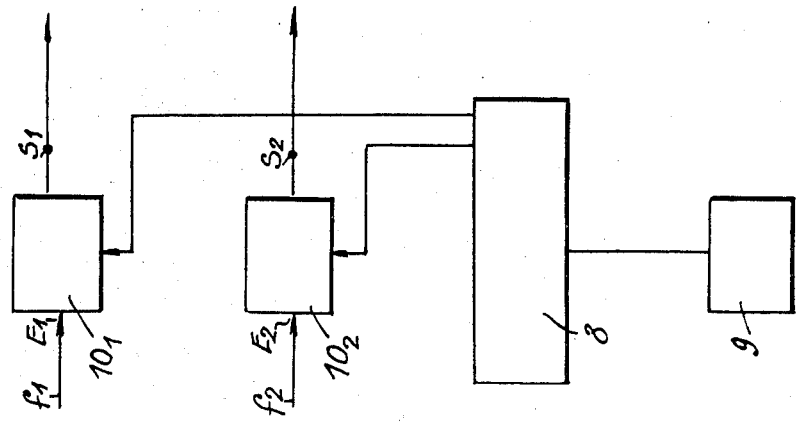
FIG. 5 is a schema showing all details of the realization of one of the components appearing on FIGS. 1 and 2.

Circuit 10, which is designed to enable the separation in time, of the pulses of frequency $f_1$ and $f_2$, is for example composed, as shown in FIG. 5 by means of buffer memories $10_1$ and $10_2$ designed to store temporarily and respectively said $f_1$ and $f_2$ pulses, at the moment when they are applied on $E_1$, $E_2$ inputs. The memories $10_1$, $10_2$ are connected to a clock 9 through a control cyclic regulator 8 and, consequently, they periodically receive reading signals shifted in the time, which allows the successive reading of said memories $10_1$, $10_2$ and consequently the differentiation in the time, of the $f_1$, $f_2$ pulses.

Since the circuits $10_1$ and $10_2$ are read in succession, then they give at their $S_1$ and $S_2$ outputs, signals of which the number corresponds to the $f_1$, $f_2$ input signals, but dephased with regard to the latter, since said $S_1$, $S_2$ signals are respectively synchronized with the signals produced by the clock 9.

The outputs $S_1$ and $S_2$ from memories $10_1$, $10_2$ of circuit 10 are connected to the inputs of a bistable rocker 111 composed of two NAND-circuits 11A and 11B, with crossed inputs, i.e. one of the two inputs that each of them comprises, is connected to the output of the other circuit, as shown on FIG. 1.

The outputs of rocker 11 are respectively connected to the J- and K-inputs of a bistable flip-flop 12 of which the effective rocking motion is produced only at the arrival of a releasing signal applied to an auxiliary input D. The flip-flop 12 can, for example a be made in the form of an integrated circuit, sold by Texas Instrument, under the reference SN 7472 N.

The input D of flip-flop 12 is connected to the $S_1$, $S_2$ outputs of circuit 10, through a circuit NAND 13, at the outlet thereof is connected a differentiation circuit 14 which acts as a delay circuit, that is the pulse which is eventually issued therefrom arises only at the end of pulses which can be provided from $S_1$ and $S_2$ outputs. Circuit 14 can, for example, be constituted of a monostable circuit, responsive to the rear front of pulses eventually coming through the NAND-circuit 13, and thus depending whether pulses are present or not at the $S_1$ and $S_2$ outputs of circuit 10.

A second circuit NAND 15 having two inputs has its first input connected to output $S_1$, through a reversing circuit or NOT-circuit 16 and its second input connected to output Q of flip-flop 12.

With reference to FIG. 1, we will now explain the operation of this comparison circuit assuming that $f_1$ and $f_2$ frequencies are such as $f_1 \geq f_2$. It is also assumed that a the start the rocker 11 is in the status where $J=1, K=0$ and flip-flop 12 in the status where $Q=1$.

Figure 3:
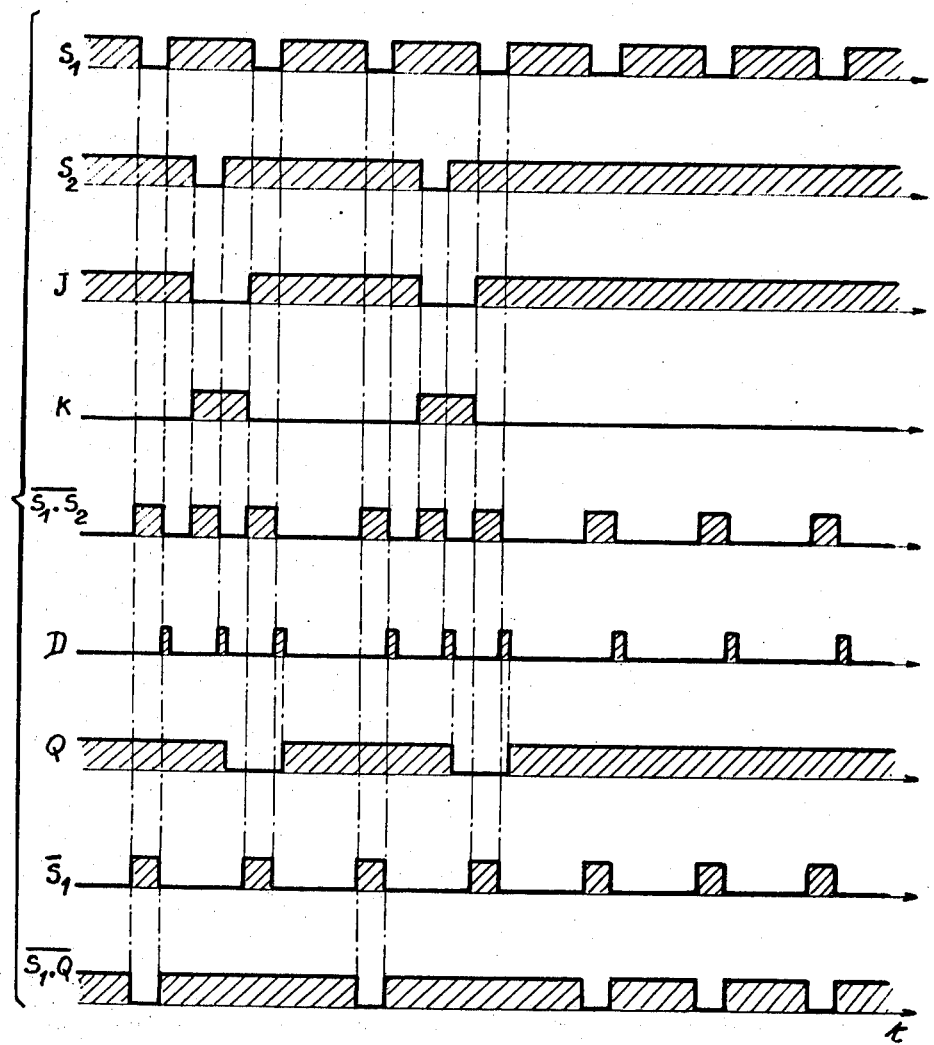
FIG. 3 is a diagram explaining the operation of the frequency comparison circuit, of the preceding figures.

FIG. 3 shows, in function of time $t$ indicated in abscissa, the shape of the signals in different spots on the circuit.

In what follows, it is considered—taking into consideration the type of the gate-circuits on the drawings—that the pulses at $E_1$ and $E_2$ inputs are negative. It is obvious that the invention could be put into operation in the same way if said pulses were positive but it would be necessary to fit the different logical circuits in a corresponding way.

A negative pulse coming through $E_1$ input and reappearing in $S_1$, has no effect on rocker 11 which remains in the status where $J=1$. Consequently the flip-flop 12 remains in the initial status where $Q=1$. Circuit 15 receiving on its inputs, the signals $\bar{S}_1$ ($S_1=0$, $\bar{S}_1=1$) and $Q=1$ gives to its output F the signal $\bar{S}_1 \cdot Q$ ($\bar{S}_1 \cdot Q=0$) which is a negative pulse. The circuit 13, itself, gives the signal $S_1 \cdot S_2$ which is a positive pulse; its rear front differentiated by circuit 14 appears at the D-input in the form of a fine delayer pulse which, applied to flip-flop 12, does not remove it from the status where $Q=1$, that is without causing its rocking motion.

The $f_1$ input pulse, applied in $E_1$, has then been transmitted. If other pulses are applied, still in $E_1$, a process similar to the one which has just been described starts again so that at the output F is found the same number of pulses as at $E_1$ input, that is the $f_1$ frequency.

Now, if a negative pulse $f_2$ applied in $E_2$, arrives, this pulse reappearing in $S_2$ causes the rocking motion of rocker 11 into the status where $J=0, K=1$, which polarizes the flip-flop 12 in such a way that the further arrival of the releasing pulse from circuit 14, on its auxiliary inlet D will cause its rocking into the status where $Q=0$.

Circuit NAND 15, before rocking of flip-flop 12, receives still a signal $Q=1$, but $\bar{S}_1$ having now the complementary value ($\bar{S}_1=0$a) no pulse appears at the F-output, so that the pulse applied to input $E_2$ is not transmitted.

Circuits 13 and 14, as previously, give in D a delayed pulse which then causes the effective rocking motion of flip-flop 12 into the status where $A=0$, status in which it acts as locking of the circuit 15 for the next pulse $f_1$ applied to $E_1$.

The next pulse arriving on $E_1$ will cause again the rocking of rocker 11, into the status where $J=1$, that polarizes the flip-flop pulse on its input D will cause its rocking into the status where $Q=1$, but does not rock it yet. Then circuit 15 receiving the $\bar{S}_1$ signal having the initial value ($\bar{S}_1=1$), but with $Q=0$, does not transmit this input pulse which is consequently removed from the $f_1$ series.

The delayed differentiation pulse obtained in D return the flip-flop 12 into the status where $Q=1$, so that it is reset to the initial status.

It has been assumed $f_1 \cdot f_2$, consequently, as shown in FIG. 3, no more than one pulse can be provided in $E_2$ (consequently in $S_2$) between two pulses in $E_1$ (consequently in $S_1$). It can be seen that each pulse in $E_2$ (itself not transmitted) cancels the transmission of the next pulse in $E_1$. The signal, obtained at the F-output, on a meter 18 is thus well representative of the difference of frequencies $f_1 - f_2$, whatever be the ratio $f_1/f_2 \geqslant 1$.

To obtain a representative signal of the difference of input frequencies, when $f_2 > f_1$, the comparison circuit can be completed to become symmetrical.

FIG. 2 shows the addition to the FIG. 1, of a NAND-circuit 15, with two inputs, one being connected to output Q of flip-flop 12, the other to output $S_2$ through a reversing circuit 16'.

If $f_2 > f_1$, at output F' is obtained a signal representative of the difference between frequencies $f_2$ and $f_1$, whatever be the ratio $f_2/f_1 \geqslant 1$, i.e. $f_2 \geqslant f_1$.

Figure 4:
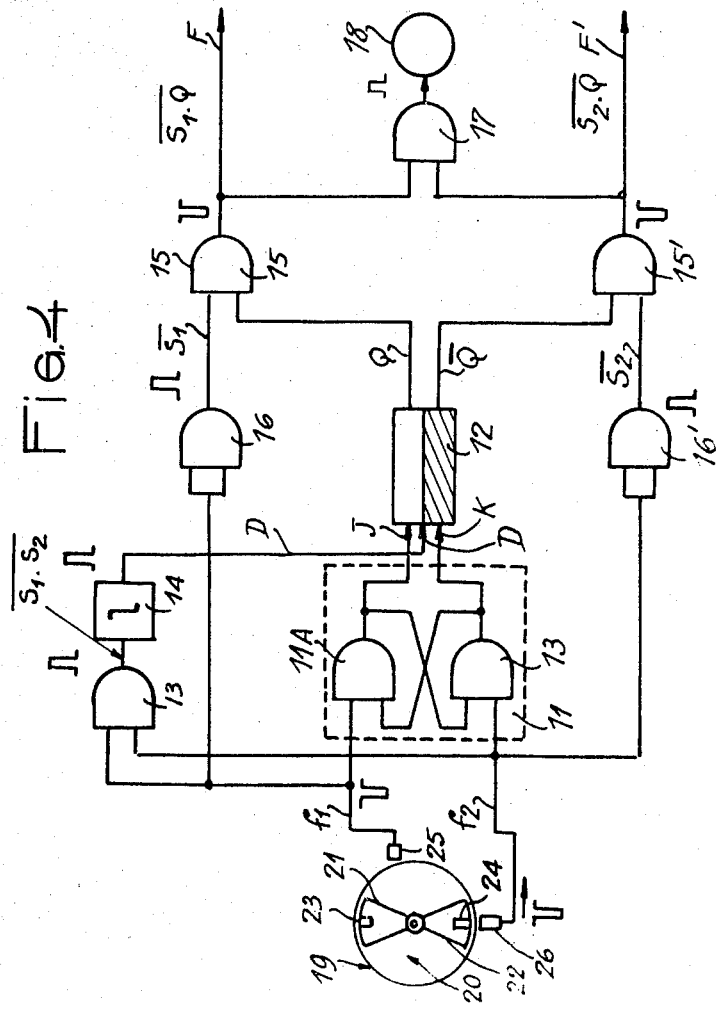
FIG. 4 is a schema of a circuit similar to the one of FIG. 2 and showing a special application of this circuit.

In some applications, the frequency pulses $f_1$ and $f_2$ can be phase shifted without it being necessary to connect up the circuit 10 of FIGS. 1 and 2. So is the case, for example, when utilizing, as shown in FIG. 4 a flow metric captor 19 of which the turbine 20 has two blades 21, 22 provided respectively with magnets or similar components 23, 24. Outside captor 19 are located windings 25 and 26 which are, for example, shifted of $\pi/2$ one with respect to the other, when magnets 23, 24 are shifted of $\pi$. The windings 25 and 26 can then be connected directly to one of the inputs of circuits NAND 11A and 11B of the bistable rocker 11.

The whole circuit is then realized as described with reference to FIG. 2 but outputs F and F' are connected to a NAND-circuit 17 of which the output itself connected to counter 18. It is then possible to detect on counter 18 any interference pulses which can be present on the two ways to circuits NAND 11A and 11B. As a matter of fact, frequently such interference pulses are submitted in large length cables connecting miscellaneous meters or receivers, these cables can run close to device causing interferences. Since the device, such as shown modified, in FIG. 4, allows the detection of interference frequencies, it is then possible to correct, if necessary, the results obtained from the circuit FIG. 1 or from the circuit FIG. 2.

I claim:

1. Frequency-comparative circuit of two pulse series, said circuit giving a signal at a frequency equal to the difference of frequencies of said two pulse series, comprising a two-output bistable rocker having two inputs respectively connected to two circuits providing said pulse series, a two-output bistable flip-flop having two inputs each respectively connected to the two outputs of said bistable rocker, said bistable flip-flop including an auxiliary input whereby rocking of said flip-flop is caused by a control signal applied at said auxiliary input, a two-input delay circuit connected through the output thereof to said auxiliary input of said flip-flop and through each of its two inputs respectively to the two inputs of said rocker, and at least one two-input NAND circuit of which one of the two inputs is connected to one of the two outputs of the said flip-flop and of which the other input is connected to one of the two inputs of said rocker through a reversing circuit, so that each pulse of one of said two pulse series prevents the passage of the next pulse from the other series whereby it appears, at the output of said NAND circuit, pulses corresponding to the difference between the number of pulses of said two pulse series.

2. Frequency-comparative circuit as set forth in claim 1 comprising two two-input NAND circuits of which one of the respective two inputs is connected through a reversing circuit to each of the two outputs of the flip-flop, the other input of each of said NAND circuits being connected to each of the two inputs of said rocker, whereby a pulse corresponding to the frequency difference of said two pulse series, is obtained at the output of one of the two NAND circuits whatever be the ratio of frequencies existing between said two mentioned pulse series.

3. Frequency-comparative circuit as set forth in claim 2 comprising further a third two-input NAND circuit of which the inputs are respectively connected to the output of said two two-input NAND circuits whereby said third NAND circuit output gives a ZERO indication, when the two pulse series are of the same frequency, and an information of interference frequency when such an interference frequency is produced in the transmission circuits of said two pulse series.

4. Frequency-comparative circuit as set forth in claim 1 comprising further a pulse separating and synchronizing circuit, interconnected between said circuits applying said two pulse series and the inputs of said rocker, said separating and synchronizing pulse circuit comprising two temporary memories to which said two pulse series are respectively applied and a clock connected to a cyclic distributor being itself connected to each of said two temporary memories, whereby said memories are successively and in synchronism put into operation with the clock and they submit pulses corresponding to said two pulse series but shifted in the time with regard to the latter.

5. Frequency-comparative circuit as set forth in claim 1, wherein said rocker includes two NAND circuits, one of the inputs of each NAND circuit being connected to the output of the other NAND circuit, and the second input of each of said two NAND circuits being respectively connected to said circuits providing the two pulse series.

* * * * *